United States Patent [19]

Fukushima et al.

[11] 4,324,478

[45] Apr. 13, 1982

[54] PHOTOSENSITIVE SHEET HANDLING METHOD AND DEVICE

[75] Inventors: Osamu Fukushima; Masahide Akisada; Takashi Koizumi, all of Minami-ashigara, Japan

[73] Assignee: Fuji Photo Film Co., Ltd., Kanagawa, Japan

[21] Appl. No.: 151,050

[22] Filed: May 19, 1980

[30] Foreign Application Priority Data

May 24, 1979 [JP] Japan ..................... 54-64297
Jun. 8, 1979 [JP] Japan ..................... 54-72045

[51] Int. Cl.[3] ..................... G03D 3/08; G01N 23/04

[52] U.S. Cl. ..................... 354/312; 354/319; 250/468; 271/270

[58] Field of Search ............... 354/312, 316, 319, 320, 354/321, 322, 310; 250/468; 271/65, 186, 270, DIG. 9; 355/27, 28, 100; 226/44, 45

[56] References Cited

U.S. PATENT DOCUMENTS

| | | | |
|---|---|---|---|
| 3,225,989 | 12/1965 | Stine | 226/44 |
| 3,523,687 | 8/1970 | Peterson et al. | 271/186 |
| 3,720,408 | 3/1973 | Horn | 354/312 |
| 3,863,913 | 2/1975 | Hirafuji | 271/270 |
| 3,891,854 | 6/1975 | Hura | 250/468 |
| 3,966,198 | 6/1976 | Komada et al. | 271/270 |
| 4,245,835 | 1/1981 | Turner | 250/468 |

FOREIGN PATENT DOCUMENTS

| | | | |
|---|---|---|---|
| 51-98029 | 2/1976 | Japan . | |
| 52-37433 | 3/1977 | Japan . | |
| 1501116 | 2/1978 | United Kingdom | 354/319 |

*Primary Examiner*—L. T. Hix
*Assistant Examiner*—Alan Mathews
*Attorney, Agent, or Firm*—Sughrue, Mion, Zinn, Macpeak & Seas

[57] ABSTRACT

Method and apparatus for handling photosensitive sheets in which the photosensitive sheets to be processed drop by force of gravity upon the opening of a cassette which held the sheets. The sheets thus dropped are delivered to a retaining position, which is shielded from light, at a speed higher than the normal conveyance speed in an automatic developing machine which subsequently processes the sheets. Thereafter, the sheets are delivered to the automatic developing machine from the retaining position. The difference is determined between the delivering speed and the conveyance speed in the automatic developing machine. The driving of the delivering device is suspended when the curvature of the photosensitive sheet is beyond the predetermined value as determined by the difference.

10 Claims, 16 Drawing Figures

PHOTOSENSITIVE SHEET HANDLING METHOD AND DEVICE

BACKGROUND OF THE INVENTION

The present invention relates to a method of handling a photosensitive material in the form of a sheet, hereinafter referred to as "a photosensitive sheet" in which, after being photographically exposed, the photosensitive sheet is allowed to drop by its own weight in response to the opening of a cassette and the photosensitive sheet thus dropped is delivered into an automatic developing machine.

A variety of devices for automatically opening in a light room a cassette used for X-ray photography to remove a film therefrom and delivering the film to an automatic developing machine, hereinafter referred to as "automatic feeders", have been proposed in the art. However, such conventional automatic feeders are disadvantageous in that their work efficiency is still low.

Such feeders will be described in more detail. With the conventional automatic feeder, the film is handled as follows. The cassette is inserted into and taken out of the automatic feeder which has, in general, a light-shielded structure, by opening and closing its cover. The cover of the automatic feeder must be maintained closed until the film discharged by opening the cover of the cassette is delivered into the automatic developing machine. That is, the cassette cannot be removed from the automatic feeder until the film is perfectly delivered into the automatic developing machine. Thus, the conventional automatic feeder is disadvantageous in that the necessary waiting period which must elapse from the instant that the film is discharged from the cassette until the cassette is taken out of the automatic feeder is relatively long and the processing interval between the time the top edge of a film is discharged from the following cassette and the passing of the rear edge of a film discharged from the preceding cassette is excessively long. Therefore, the maximum processing ability of the automatic developing machine has not been fully utilized.

Accordingly, an object of the invention is to provide a method and apparatus for handling photosensitive sheets in which the above-described difficulties accompanying a conventional method have been eliminated, specifically, in which the period waiting from the instant that a photosensitive sheet is discharged from a cassette until the cassette is taken out of an automatic feeder is reduced to improve the work efficiency and the time interval for processing photosensitive sheets in an automatic developing machine is decreased to fully utilize the maximum processing ability of the automatic developing machine.

The invention relates also to a method and apparatus for delivering a photosensitive material in the form of "a photosensitive sheet" to an automatic developing machine. More particularly, the invention further relates to a photosensitive sheet delivering method and apparatus in which a photosensitive sheet is delivered to a sheet introducing device of the automatic developing machine at high speed.

If plural photosensitive sheets are processed by successive delivery to an automatic developing machine, in order to fully utilize the maximum processing ability of the automatic developing machine, it is preferable that the processing interval between the rear edge of the preceding photosensitive sheet and the front edge of the following photosensitive sheet be made as small as possible. In general, the operation of a mechanism for extracting photosensitive sheets one after another from a cassette or a magazine is intermittent. Therefore, it is necessary that a photosensitive sheet be delivered to the sheet introducing device of the automatic developing machine at high speed to reduce the distance between the sheet and the photosensitive sheet which was previously processed.

It is necessary that the timing of suspending the driving of the delivery device which delivers photosensitive sheets to the automatic developing machine be set according to a detecting technique in which the position of a photosensitive sheet delivered is positively and accurately detected. The timing should occur after the top edge of the photosensitive sheet has been positively inserted into the introducing device. Otherwise, the sheet would stop before being caught up by the introducing device. If the timing is too late, then the sheet may suffer from "kinking fog" because the sheet is excessively curved because of the difference between the speeds of the delivering device and the introducing device or it may suffer from scratches which are made by contact and friction.

Two techniques for detecting the insertion of the top edge of the photosensitive sheet into the sheet introducing device of the automatic developing machine are known in the art. One of the two techniques is a direct detection technique. When a photosensitive sheet is inserted between a pair of rollers which form the above-described sheet introducing device, one of the two rollers is caused to rise by as much as the thickness of the photosensitive sheet. With this direct detection technique, this rise is increased by a lever mechanism and is then detected by a limit switch. The other technique is an indirect detection method in which the passage of a photosensitive sheet is detected by a limit switch or a photoelectric detector provided ahead of the sheet introducing device. With this technique it is assumed that when a predetermined period of time passes from the time of detection of the passage of the sheet, the top edge of the sheet has been inserted into the sheet introducing device.

In the direct detection technique, in order to prevent erroneous operation it is necessary to accurately adjust the gap between the two rollers in accordance with the thickness of the photosensitive sheets being processed because the operation of the limit switch depends on the gap. Thus, the direct technique is disadvantageous in that it is rather difficult in handling, low in reliability, and requires an intricate mechanism and accordingly a device for practicing this technique has a relatively high manufacturing cost.

On the other hand, in the indirect detection technique, since the driving of the sheet delivering means is suspended when a period of time set by a delay timer elapses following the time of detection, it is necessary to accurately adjust the delay timer. Accordingly, the indirect detection technique is also disadvantageous in that it is low in reliability because of the fluctuations of the delay timer and a device for practicing the technique also has a high manufacturing cost because of the employment of the delay timer.

Thus, another object of the invention is to provide a method and apparatus for delivering photosensitive sheets to an automatic developing machine in which the position of a photosensitive sheet, which determines the timing of suspending the driving of a sheet delivering means which delivers photosensitive sheets to the sheet introducing device of an automatic developing machine at a speed higher than the conveyance speed in the automatic developing machine, is positively and accurately detected thereby eliminating the above-described difficulties accompanying the conventional techniques.

SUMMARY OF THE INVENTION

The foregoing and other objects of the invention have been achieved by the provision of a photosensitive sheet handling method in which, according to the invention, a photosensitive sheet is allowed to drop by force of its own weight in response to the opening of a cassette which held the photosensitive sheet, the photosensitive sheet thus dropped is delivered to a retaining position shielded from light at a speed higher than the normal conveyance speed in an automatic developing machine adapted to process the photosensitive sheet, and thereafter the photosensitive sheet is delivered to the automatic developing machine from the retaining position.

With respect to the conveyance of a photosensitive sheet at high speed before it is conveyed to an automatic developing machine, Japanese Laid-Open Patent No. 98029/1976 has disclosed an appropriate "sheet conveying method". According to this method, photosensitive sheets piled one on another in the form of a stack are separated one after another beginning with the top sheet and the sheets thus separated are delivered to an automatic developing machine at different high and low conveyance speeds. That is, they are delivered at a high speed in the first half of the conveying course and at a low speed in the second half of the conveying course.

With respect to the delivery of a photosensitive sheet which has been conveyed to a retaining position at the following stage, Japanese Laid-Open Patent No. 37433/1977 had disclosed an appropriate "sheet inverting device". In this device, after a sheet delivered from a copying machine has been brought to a retaining device and the sheet is passed through an inclined sheet dropping section with the rear edge of the sheet at the top, the sheet is inverted and is stored in a sheet storing device. A sheet inverting technique in which, after a sheet has been delivered to a retaining position, the sheet is conveyed out with the rear edge of the sheet at the top as described above has been disclosed in Japanese Utility Model Publication No. 8104/1966 which is directed to "a sheet-shaped material inverting and delivering device" and U.S. Pat. No. 3,523,687 entitled "Inverter for Sheets and Cards".

The present invention advantageously utilizes in combination the principles employed in these prior disclosures wherein, according to the method of the invention, after a photosensitive sheet discharged out of the cassette has been delivered quickly to a retaining position shielded from light, the cassette is taken out of the automatic feeder and thereafter the photosensitive sheet is delivered to the automatic developing machine from the retaining position. Thus, the discharge of photosensitive sheets is carried out with a high efficiency to deliver the photosensitive sheets into the automatic developing machine. Thus, with the use of the present invention, the conveyance speed of the photosensitive sheets is not merely varied between high and low speeds. Moreover, in accordance with the invention the sheets are not merely inverted.

The foregoing objects and other objects of the invention have also been achieved by the provision of a method and apparatus for delivering photosensitive sheets to an automatic developing machine, in which, according to the invention, the driving of the delivering device is suspended when the photosensitive sheet is curved beyond a predetermined radius of curvature which is determined in accordance with a difference between a delivering speed of a delivering device for delivering a photosensitive sheet at a speed higher than a conveyance speed in the automatic developing machine and the introducing speed of an introducing device in the automatic developing machine which is adapted to introduce the photosensitive sheet from the automatic feeder to the automatic developing machine.

DESCRIPTION OF THE PREFERRED EMBODIMENTS

The invention will be described with its preferred embodiments shown in the accompanying drawings.

Figure 1:
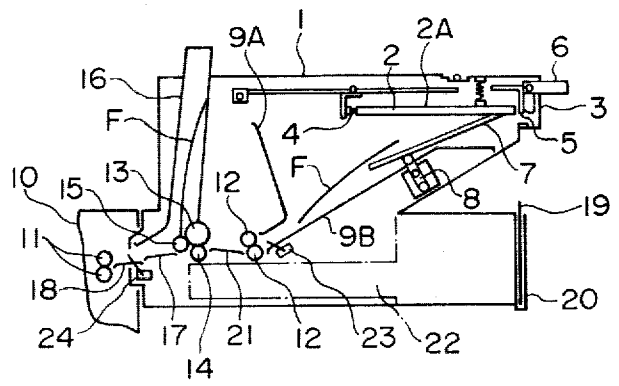
FIG. 1 is a side view showing essential components of an automatic feeder of a first embodiment of this invention.

An automatic feeder 1, as shown in FIG. 1, includes a cover 3 for the insertion and removal of a cassette 2; a cover opening device having a locking releasing pin 4 for depressing the cover locking member of the cassette 2, a depressing member 5 adapted to depress the cassette 2 toward the pin 4, and a handle 6; a guide device having a vibrator 8 for vibrating the cover 7 of the cassette to release the film from contact with the cassette and a front guide panel 9A and a rear guide panel 9B for guiding a film F which has been discharged from the cassette 2 and slides down by force of its own weight; a conveying device having a pair of rollers 12 and a set of rollers 13, 14 and 15 adapted to convey a film at a speed higher than the conveying speed of a pair of feeding rollers 11 in an automatic developing machine 10; a retaining device 16 for retaining in an inclined position a film which is delivered upwardly by the set of rollers 13, 14 and 15 of the conveying means; a shifting device including the roller 15 which operates to deliver a film to the retaining device 16 and to shift the rear end of the film F to a position at which the film is allowed to slide down by force of its own weight hereinafter referred to as "a self-weight slide down position"; a conveyance guide device including guide panels 17 and 18 which delivers the film toward the pair of rollers 11 and which slides down by its own weight with the rear end at the top; a printing device having a card insertion section 20 into which a card 19 is inserted, the card 19 having an identification mark such as the name of a patient, and an optical system 22 which forms the image of the identification mark of the card 19 at a printing position 21 and performs a flash exposure thereof; and a film detecting device having limit switches 23 and 24 which detect the presence of a film F and in response thereto controls the operations of the various structures described above.

With regard to the cassette 2, the cover 7 is hinged to the body of the cassette having the front panel 2A in such a manner that it can be freely opened and closed (not illustrated in detail). Intensifying screens are provided on the inner surfaces of the front panel 2A and the cover 7. A cover locking member is provided at the front end of the cover 7. The cover locking member is energized forwardly by means of a spring so as to lock the cover 7 to the body. Provided at the front end of the body are a locking pawl for locking the cover locking member and an aperture for unlocking the cover locking member from the body with the locking releasing pin 4. When the cover 7 is closed after a film has been positioned between the intensifying screens in the cassette 2, the cover locking member is engaged with or locked by the locking pawl.

The cassette is inserted in place in the automatic feeder 1 by opening and closing the cover 3 after which the handle 6 is operated. As a result, the cassette 2 is pushed forwardly by the depressing member 5 and the cover locking member is depressed by the locking releasing pin 4 engaging through the aperture whereby the cover 7 is opened as illustrated and the film F is allowed to drop by its own weight and is thus discharged. As soon as the cover 7 is opened, the vibrator 8 is operated to vibrate the cover 7. Therefore, even if the film may have a tendency to stick to the intensifying screen on the cover 7, such close contact is eliminated by the vibration as a result of which the film is allowed to drop by force of its own weight.

The film F after being released from the cassette 2 is guided by the guide panels 9A and 9B. That is, it slides along the guide panel 9B by force of its own weight. While the film F is moving, the presence of the front end of the film is detected by the limit switch 23. Finally, the film F reaches the pair of rollers 12.

Upon detection of the front end of the film F by the limit switch 23, the vibrator 8 is stopped while the pair of rollers 12 and the set of rollers 13, 14 and 15 are activated. Accordingly, the film F is conveyed to the retaining device by the pair of rollers 12 and the set of rollers 13, 14 and 15. Also, the printing device is activated a predetermined period of time after the limit switch 23 has detected the rear end of the film F so that the identification mark from the card 19 is printed on the rear edge portion of the film. The rear end of the film conveyed to the retaining device is shifted to the self-weight slide down position by the roller 15 so that the film slides down along the guide panels 17 and 18 with the rear end of the film at the top. Thus, the film is delivered to the automatic developing machine 10 by the pair of delivering rollers 11. When, in this operation, the limit switch 24 detects the rear end (at the top) of the film, the rollers 12 and the set of rollers 13, 14 and 15 are stopped and an indication is produced, for instance by a lamp, to inform the operator that the cassette 2 can be replaced by the next cassette.

Control is provided so that, even if the limit switch 23 has detected a new film has been discharged as a result of the insertion of a new cassette, the pair of rollers 12 and the set of rollers 13, 14 and 15 are not operated until the limit switch 24 has detected the passage of the preceding film. Therefore, the top edge of the next new film is held at the nip of the pair of rollers 12. When the two conditions are satisfied that the limit switch 24 has detected the passage of the preceding film and the limit switch 23 has detected the top edge of the next film, the conveying device is operated again so that the next film is delivered to the retaining device 16.

Figure 2:
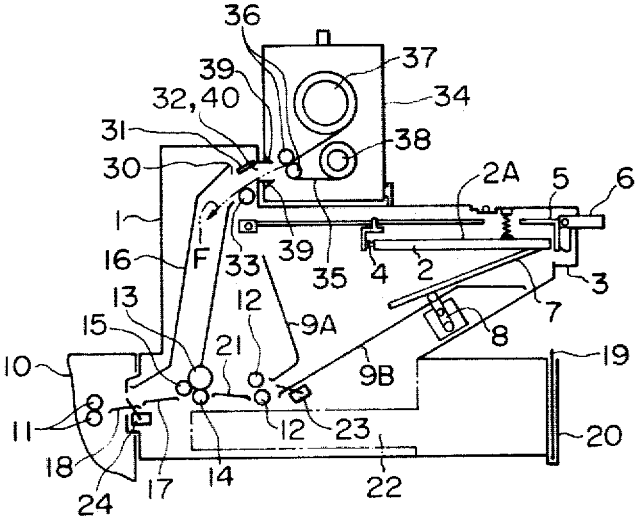
FIG. 2 is a side view showing essential components of an automatic feeder which is a modification of the automatic feeder of FIG. 1.

FIG. 2 shows a modification of the device shown in FIG. 1. In this modification, a film is delivered into the automatic developing machine through a path which is different from the path for delivering a film released by opening the cover of the cassette 2. That is, the device in FIG. 2 is different from one in FIG. 1 in that the retaining device is so arranged that it serves also as a guide to cause a film introduced through the separate path to slide down by its own weight. An opening 30 is provided at the upper portion of the retaining device 16. The opening 30 is positioned in alignment with an insertion inlet 32 which is normally closed by a shutter 31. A guide roller 33 is disposed between the opening 30 and the inlet 32. A magazine 34 successively feeds films F. The magazine 34 is provided with a handle which can be removed from the automatic feeder 1 so that it can be carried by the operator if desired and a belt 35 between which the films are wound like a wirl. The belt 35 is laid over one of feeding rollers 36 and drums 37 and 38. The magazine 34 is further provided with an opening 40 which is normally closed by a shutter 39.

The magazine 34 is mounted on the automatic feeder 1 as shown in FIG. 2. Upon operation of a start switch (not shown), the drum 38 is turned. When the belt is turned a predetermined length on the drum 38, the film wound on the drum 37 is allowed to slide down by its own weight from the insertion inlet 32 through the guide roller 33 and the opening 30 to the retaining device by way of the feeding rollers 36. Furthermore, the film thus sliding down is guided by the retaining device 16 and the guide panels 17 and 18 and is then delivered to the automatic developing machine 10 by the pair of rollers 11. When the limit switch 24 has detected the passage of the film, the drum 38 is turned again so that the belt 35 is moved the predetermined length to release the next film. In the above-described manner, the films in the magazine 34 are delivered to the automatic developing machine 10 one after another.

Figure 3:
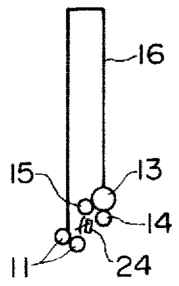
FIGS. 3 and 4 are side views showing modifications of a guide device used in the embodiment in FIG. 1.

FIG. 3 shows a part of another embodiment of the invention, in which the pair of feeding rollers 11 of the automatic developing machine are provided directly below the retaining device 16 and the roller 15 and the pair of rollers 11 are utilized as guides for delivering a film which has been shifted to the self-weight slide down position with the rear end of the film at the top. In this case, as the film is allowed to slide in a straight line down to the rollers 11, the film is properly delivered to the automatic developing machine.

Figure 4:
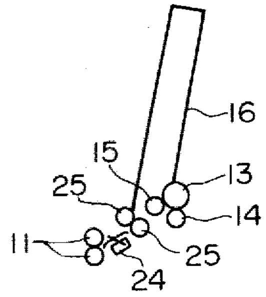

FIG. 4 shows a part of another embodiment of the invention in which, instead of the guide panel 17 used in the embodiment of FIG. 2, two guide rollers 25 are provided as conveyance guide devices for delivering a film which has been shifted to the self-weight slide down position with the rear end of the film at the top. In this case, after the film has slid down to the guide rollers 25 from the self-weight slide down position, the film is forcibly delivered to the pair of rollers 11 of the automatic developing machine by the guide rollers 25. The guide rollers 25 may be continuously rotated at a conveyance speed equal to that of the pair of rollers 11. However, the conveyance speed of the guide rollers 25 also may be switched in two steps so that the guide rollers 25 are rotated at a conveyance speed higher than that of the rollers 11 until the light switch 24 detects the top edge of the film immediately before it is inserted into the rollers 11. Thereafter the rollers 25 are rotated at a conveyance speed equal to that of the rollers 11. Alternatively, the rollers 25 may be suspended when the top edge of the film is inserted between the rollers 11.

In the above-described embodiments, the photosensitive sheet is allowed to slide down by force of its own weight from the retaining position to the automatic developing machine. However, it is sometimes necessary to deliver the photosensitive sheets to the automatic developing machine with a higher positional accuracy or it is required to deliver the photosensitive sheets to the automatic developing machine more positively and efficiently. In such a case, it is desirable that the rear edge of the sheet to be delivered to the retaining device 16 be transferred to the conveying means directly from the shifting device so that the sheet is forcibly delivered into the automatic developing machine by the conveying means.

Figure 5:
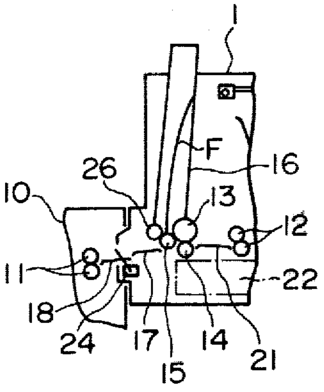
FIGS. 5 and 6 are side views showing additional modifications of the invention in each of which a film is forcibly conveyed from its retained position without sliding from the retaining device.

Embodiments of the invention suitable for such a case will be described. A first embodiment of this type is shown in FIG. 5, and a second in FIG. 6. In each of these embodiments, a roller 26 is disposed adjacent to the roller 15 so that the two rollers 26 and 15 form a conveying device. In each of the embodiments shown in FIGS. 5 and 6, when the rear edge of the film F delivered to the retaining device 16 by the set of rollers 13, 14 and 15 is brought between the rollers 13 and 15, the rear edge is moved to the nip of the rollers 15 and 26. As a result, the film F is delivered out of the retaining means 16 by the rollers 15 and 26 with the rear edge of the film at the top and is then inserted between the pair of rollers 11. When the limit switch 24 detects the top edge of the film, the conveyance speed of the rollers 13, 14 and 15 and the roller 26 is changed to be equal to that of the rollers 11.

Figure 6:
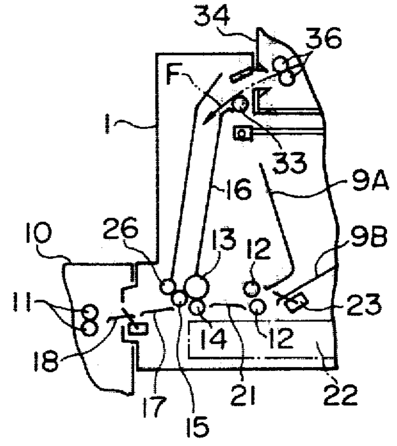

In the embodiment of FIG. 6 in the case where the films in the magazine are fed out upon mounting of the magazine 34 on the automatic feeder 1, the set of rollers 13, 14 and 15 and the roller 26 are turned at high speed and the film released from the magazine 34 and allowed to slide down by its own weight with the retaining device 16 as the guide is inserted between the rollers 11 by the conveyance device composed of the rollers 15 and 26. When, in this operation, the limit switch 24 detects the top edge of the film, the conveyance speed of the set of rollers 13, 14 and 15 and the roller 26 is changed to be equal to that of the pair of rollers 11. Thereafter, when the limit switch 24 detects the passage of the film, the set of rollers 13, 14 and 15 and the roller 26 are rotated at the high speed again and the belt 35 is moved by the predetermined length on the drum 38 to discharge the following film.

Figure 7:
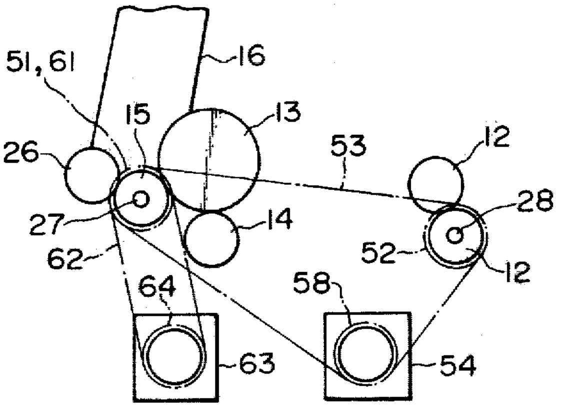
FIG. 7 is a side view illustrating the conveying device, the shifting device, and a drive system of the conveying device in the embodiments shown in FIGS. 5 and 6.
Figure 8:
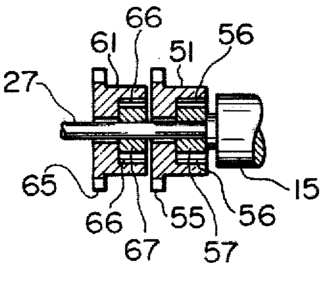
FIG. 8 is a longitudinal sectional view of sprockets incorporating clutches of the drive system shown in FIG. 7.
Figure 9:
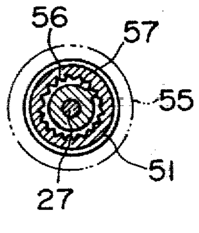
FIG. 9 is a cross-sectional view of the sprockets.

FIG. 7 is a side view showing the conveying device and the shifting device used in the above-described embodiments and a drive system for the conveying device. FIG. 8 is a longitudinal sectional view of a drive mechanism for the roller 15. FIG. 9 is a cross-sectional view of part of the drive mechanism shown in FIG. 8.

In shown in these Figures, the roller 15 has a shaft 27 which is in contact with the rollers 13 and 26. Two sprockets 51 and 61 incorporating one-way clutches are provided on the shaft 27. A sprocket 52 is provided which is directly coupled on the shaft 28 of one of the pair of rollers 12. An endless chain 53 is laid over the sprockets 51 and 52 and a sprocket 58 directly coupled to high speed drive motor 54 is used to convey films at a high speed. The sprockets 52 and 51 are turned through the sprocket 58 by the motor 54. The sprocket 61 is turned through an endless chain 62 by the sprocket 64 which is directly coupled to a low speed drive motor 63 which is used to convey the film at a speed equal to the conveyance speed of the automatic developing machine. It should be noted that the sprockets 51 and 61 are not directly coupled to the shaft 27 of the roller 15. That is, the sprockets 51 and 61 have outer teeth 55 and 65 and inner teeth 56 and 66, respectively. The inner teeth 56 and 66 are engaged with clutch pawls 57 and 67 fixedly secured to the shaft 27 of the roller 15 thus forming the aforementioned one-way clutches.

When the sprockets 51 and 61 are turned by the chains 53 and 62, the rotational movement is transmitted through the clutch pawls 57 and 67 engaged with the inner teeth 56 and 66 to the shaft 27 thereby to rotate the roller 15. However, the torque from the shaft 27 is not transmitted to the sprockets 51 and 61 because of the one-way clutches in which the clutch pawls 57 and 67 are allowed to slide on the inner teeth 56 and 66. Thus, in delivering a film at the high speed, the operation of the high speed drive motor 54 is started while the low speed drive motor 63 does not rotate so that all of the rollers are driven at the high speed. When the limit switch 24 detects the top edge of the film being delivered, the high speed drive motor 54 is stopped and the low speed drive motor 63 is started so that the pair of rollers 12 are stopped while the rollers 13, 14 and 15 are driven at the low speed as a result of which the film is delivered at a speed equal to the conveyance speed of the automatic developing machine. Even if, in this case, the sprocket 61 is driven so as to convey the film at a speed slightly lower than the conveyance speed of the automatic developing machine, no excessive tension is applied to the film because the sprocket 61 is coupled through the one-way clutch to the shaft 27. Therefore, even if both of the high speed drive motor 54 and the low speed drive motor 63 are stopped when the top edge of the film has been inserted into the automatic developing machine, the film is satisfactorily delivered to the automatic developing machine by the pair of rollers 11.

The retaining device for retaining photosensitive sheets conveyed at high speed by the conveying device should incline photosensitive sheets delivered to the retaining device at an angle such that the rear edge of the photosensitive sheet is shifted to the self-weight slide down position or toward the conveying device while being maintained in contact with the shifting device by the weight of the photosensitive sheet itself. Accordingly, the retaining device should be maintained inclined at least to the extent that the photosensitive sheet can slide down the retaining device by force of its own weight. Thus, the retaining device may be held vertically.

A photosensitive sheet handling method and apparatus according to the invention has been described above. The invention has practical merits in that the waiting period which elapses from the delivery of a photosensitive sheet until the removal of the cassette from the automatic feeder is significantly reduced which improves the work efficiency and the time intervals required for processing the photosensitive sheets in the automatic developing machine is decreased which results in the sufficient utilization of the maximum processing ability of the automatic developing machine.

Figure 10:
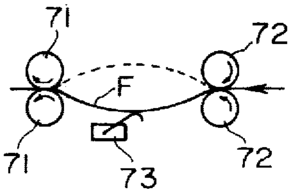
FIG. 10 is a side view showing the essential components of another embodiment of the invention.

FIG. 10 shows an embodiment of the invention relating to the second set of objectives stated above. The embodiment shown in FIG. 10 includes a sheet introducing device having a pair of rollers 71 for introducing a photosensitive sheet F into an automatic developing machine, a sheet delivering device having a pair of rollers 72 for delivering the photosensitive sheet F at a speed higher than that of the rollers 71, and a curvature detecting device which has a limit switch 73.

When the top edge of the sheet F delivered by the rollers 72 is inserted between the rollers 71, the photosensitive sheet F is curved as illustrated with the actual radius of curvature dependent on the difference between the conveyance speeds of the rollers 71 and 72. When the amount of curvature reaches a predetermined value, the limit switch 73 is operated in accordance with which the driving of the rollers 72 are suspended. In this operation, the photosensitive sheet F is usually bent toward the lower side as shown in FIG. 10. However, sometimes the sheet F may be bent toward the upper side as indicated by the dotted line in FIG. 10. Therefore, in some applications, it may be desirable to employ a curvature detecting device or a limit switch on the upper side as well as that when any one of the two limit switches is operated, the rollers 72 are suspended.

Figure 11:
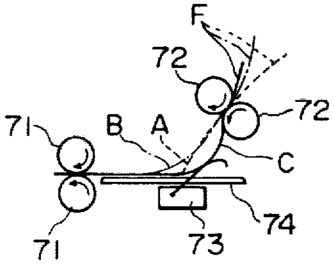
FIG. 11 is a side view showing yet another embodiment of the invention.

In many cases, the direction of advancement of a photosensitive sheet delivered by the delivering device is different from the direction of insertion of the sheet into the introducing device and therefore the direction of advancement of the top edge of the sheet is changed by a guide means such as a guide panel. FIG. 11 shows a second embodiment of the invention in accordance with the second set of objects stated above in which a guide panel 74 is provided as the guide device.

In this embodiment of the invention, the configuration of a photosensitive sheet F delivered by the rollers 72 may change from that indicated by the broken line A to that indicated by the dot-dash line B to that indicated by the solid line C in the stated order. When the sheet F has reaches a predetermined amount of curvature with the top edge inserted between the rollers 71, the limit switch 73 is operated so that the driving of the rollers 72 is suspended. In this case, it is necessary to position the limit switch 73 so that the limit switch 73 is not operated when the configuration of the photosensitive sheet is as indicated by the broken line A immediately after it has been delivered by the rollers 72 but is operated when the configuration of the sheet is as indicated by the solid line C. The guide panel 74 acts to change the direction of advancement of the top edge of the photosensitive sheet F as it is delivered by the delivering means and to cause the photosensitive sheet F to move along the guide panel 74 beginning with the front edge thereby to allow the curved sheet to approach the limit switch 73.

Figure 12:
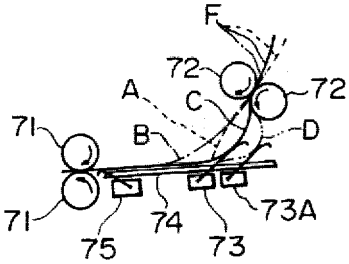
FIG. 12 is a side view showing still another embodiment of the invention.

In order to satisfy the requirement that the curvature detecting means should be positioned so that it is not operated when the configuration of the photosensitive sheet is as indicated by the broken line A in FIG. 11 but is operated when the sheet is curved by at least the predetermined amount of curvature, it may be necessary to position the limit switch at the position 73A shown in FIG. 12. That is, it may be necessary to position the limit switch at a position where the limit switch is operated when the sheet is considerably curved as indicated by the double dot-dash line D in FIG. 12. Especially in the case where the photosensitive sheet has some inherent initial curl, it is necessary to further shift the position of the curvature detecting device to the right. However, if a photosensitive sheet is excessively curved, "kinking fog" caused by breaking the emulsive coating on the film may result. Therefore, if is it possible to distinguish by detection the configuration of the photosensitive sheet that the top edge of the sheet has been inserted into the introducing device with a minimum amount of curvature from the initial configuration of the sheet as indicated by the broken line A, then it is possible to prevent the sheet from being curved by more than the amount indicated by the solid line C. For this purpose, it is necessary to provide a limit switch 75 for detecting the top edge of the sheet. That is, the limit switch 75 operates to detect the arrival of a photosensitive sheet delivered by the roller 72 of a predetermined position. It is preferable that the switch be capable of detecting the top edge of the sheet at a position near the rollers 71. In this case, when both of the limit switches 75 and 73 are operated, the rotation of the rollers 72 is suspended because the operation of the limit switch 73 effected after the operation of the limit switch 75 means that only the curvature of the photosensitive sheet has been detected.

A control which suspends the driving of the delivering device when both of the top edge detecting device and the curvature detecting device are operated will next be described. As the photosensitive sheet is delivered by the delivering device, the top edge of the photosensitive sheet operates the limit switch 73, for instance, when the condition of the sheet is as indicated by the broken line A. As the sheet moves further, the configuration of the sheet becomes as indicated by the dot-dash line B because of its rigidity and, in this case, the detection which was previously made by the limit switch 73 is made ineffective. However, as the sheet moves further, the limit switch 75 is operated, the top edge of the sheet is inserted between the rollers 71 and the sheet is curved as indicated by the solid line C as a result of which the limit switch 73 is operated again. Accordingly, the position of the curvature detecting means, i.e. the limit switch 73, is less limited. Therefore, the extent of curvature of the photosensitive sheet at the time of curvature detection is small and very little "kinking fog" is caused compared with that for the case of FIG. 11.

Figure 13:
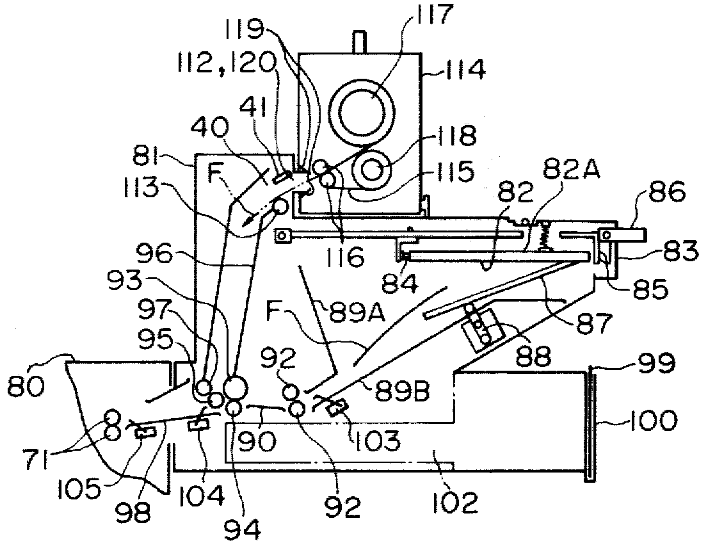
FIG. 13 is a side view showing essential components of an automatic feeder to which the teachings of the invention have been applied.

FIG. 13 is a side view showing an example of an automatic feeder to which the technical concept of the invention has been applied. An automatic feeder 81 having a light shielding structure as shown in FIG. 13 includes a cover 83 for inserting a cassette 82 into and removing it from the automatic feeder; a cover opening device having a locking releasing pin 84 for depressing the cover locking member of the cassette 82, a depressing member 85 for urging the cassette 82 toward the locking releasing pin 84, and a handle 86; a slide-down guide device having a vibrator 88 for opening a cassette cover 87 by vibration to eliminate close contact of the film F therewith and guide panels 89A and 89B for guiding a film F discharged from the cassette 82 and which drops by force of its own weight; a conveying device having a pair of rollers 92 and a set of rollers 93, 94 and 95 for conveying the film F at a speed higher than the conveyance speed of the pair of rollers 71 of the automatic developing machine 80; a retaining device 96 for retaining a film delivered upwardly by the set of rollers 93, 94 and 95 in an inclined position; a shifting device having a roller 95 which delivers the film F to the retaining device 96 and shifts the rear edge of the film F to the nip of a confronting roller 97 and the roller 95; a delivering device including the rollers 97 and 95 for delivering the film F from the retaining device 96 with the rear edge of the film at the top; a guide device having a guide board 98 adapted to change the direction of advancement of the top edge of the film delivered from the contoward the pair of rollers 71; a printing device having a card insertion section 100 into which a card 99 having an identification mark such as the name of a patient may be inserted and an optical system for performing flash exposure for forming the image of the identification mark of the card 99 on a printing position on the film; and film detecting device having limit switches 103, 104 and 105 which separately detect the film F in response to which a control device (not shown) controls the operation of the above-described components. The cassette 82 is constructed and operates the same as the cassette 2 described earlier.

The cassette is inserted in place in the automatic feeder 81 by opening and closing the cover 73 after which the handle 86 is operated. As a result, the cassette 82 is pushed forwardly by the depressing member 85 and the cover locking member is depressed by the locking release pin 84 engaging through the aperture whereby the cover 87 is opened as illustrated and the film F is allowed to drop by its own weight and is thus discharged. As soon as the cover 87 is opened, the vibrator 88 is operated to vibrate the cover 87. Therefore, even if the film may have a tendency to stick to the intensifying screen on the cover 87, such close contact is eliminated by the vibration, as a result of which the film is allowed to drop by force of its own weight.

The film F after being released from the cassette 82 is guided by the guide panels 89A and 89B. That is, it slides along the guide panel 89B by force of its own weight. While the film F is moving, the presence of the front end of the film is detected by the limit switch 103. Finally, the film F reaches the pair of rollers 92.

Upon detection of the front edge of the film F by the limit switch 103, the vibrator 88 is stopped while the pair of rollers 92 and the set of rollers 93, 94 and 95 are activated. Accordingly, the film is conveyed to the retaining means by the pair of rollers 92 and the set of rollers 93, 94 and 95. Also, the printing device is activated a predetermined period of time after the limit switch 103 has detected the rear edge of the film F so that the identification mark from the card 99 is printed on the rear edge portion of the film. The rear edge of the film conveyed to the retaining device is shifted to the nip of the rollers 95 and 97 by the roller 95 when it reaches the nip of the rollers 93 and 95 and the film is delivered from the retaining device 96 with the rear edge of the film at the top. The top edge of the film thus delivered moves along the guide panel 98 and is delivered to the automatic developing machine 80 by the pair of rollers 71. When, in this operation, the limit switch 105 detects the presence of the top edge of the film F and the limit switch 104 detects the curvature of the film, the driving of the rollers 92, 93, 94, 95 and 97 is suspended. As long as the film is present between the rollers 95 and 97, the rollers 93, 94, 95 and 97 are turned by the advancement of the film which is being conveyed by the pair of rollers 71. When the driving of the rollers 92, 93, 94, 95 and 97 is suspended, an indication is produced by means of a lamp or the like informing the operator that the cassette 82 can be replaced by a new cassette by opening the cover 83.

Control is provided so that, even if the limit switch 103 has detected a new film has been discharged from a new cassette, the pair of rollers 92 are not operated until the limit switch 105 has detected the passage of the preceding film. Therefore, the top edge of the next new film is held at the nip of the rollers 92. When the two conditions are satisfied that the limit switch 105 has detected the passage of the preceding film and the limit switch 103 has detected the top edge of the next film, then the rollers 92, 93, 94, 95 and 97 are operated again so that the next film is delivered to the retaining device 96 and is then delivered out of the retaining position by the rollers 95 and 97.

The retaining device 96 serves as a guide also for films F′ inserted from above to drop by force of their own weight through a path different from the path through which film released from a cassette 82 is delivered. More specifically, the retaining device 96 has an opening 110 in its upper part and an insertion inlet 112 provided in alignment with the opening 110. The insertion inlet is normally closed by a shutter 111. A guide roller 113 is provided between the opening 110 and the insertion inlet 111.

A magazine 114 is mounted on the automatic feeder 11 which successively feeds films F′ through the insertion inlet 112. The magazine 114 has a handle which can be removed from the automatic feeder 81 so that it may be carried with the operator if desired. In the magazine 114, a belt 115 is wound on drums 117 and 118 through one of feeding rollers 116. The belt 115 is adapted to wind film thereon. An opening 120 is provided in alignment with the inlet 112 with the opening 120 normally closed by a shutter 119.

In operation, the magazine is mounted on the automatic feeder 81 as shown in FIG. 13 and then a start switch (not shown) is operated. The rollers 92, 93, 94 and 97 are then driven and the drum 118 is rotated. When the belt 115 is wound a predetermined length on the drum 118, the film F′ wound on the drum 117 with the aid of the belt 115 is allowed to slide down into the retaining device 96 through the feeding rollers 116, the insertion inlet 112 and the guide roller 113. The film F′ is conveyed from the retaining device 96 by the rollers 95 and 97 and is then moved along the guide panel 98. Finally, the film F′ is introduced to the automatic developing machine 80 by means of the rollers 71.

When, in this case also the limit switch 105 has detected the presence of the top edge of the film F′ and the limit switch 104 has detected the curvature of the film F', the driving of the rollers 92, 93, 94, 95 and 97 is suspended. When the limit switch 105 has detected the passage of the film, the rollers 92, 93, 94, 95 and 97 are driven again and the drum 118 is rotated so that the belt 115 is wound up to the predetermined length on the drum 118 to thereby release the following film.

Figure 14:
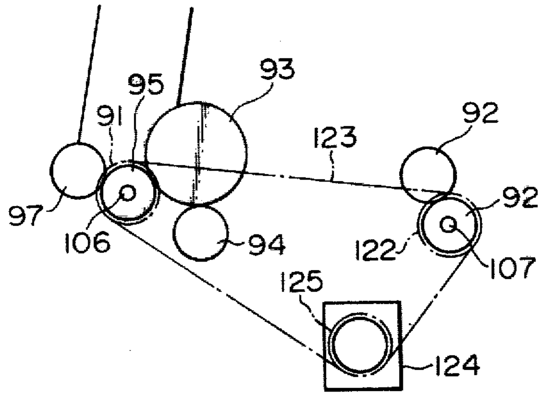
FIG. 14 is a side view showing essential components of a drive system for the device shown in FIG. 13.
Figure 15:
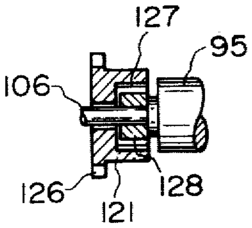
FIG. 15 is a longitudinal sectional view of a sprocket incorporating a one-way clutch used with the invention.
Figure 16:
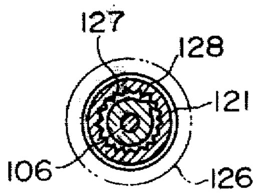
FIG. 16 is a cross-sectional view of the sprocket shown in FIG. 15.

FIG. 14 is a side view showing essential components of the conveying device, the shifting device and the drive system of the conveying device in FIG. 13. FIG. 15 is a longitudinal sectional view showing a sprocket incorporating a one-way clutch which forms the drive mechanism of the roller 95. FIG. 16 is a cross-sectional view of the sprocket shown in FIG. 15. As shown in FIG. 14, the shaft 106 of the roller 95, which is in contact with the rollers 93 and 97, is provided with a sprocket 121 incorporating a one-way clutch. Furthermore, a sprocket 122 is coupled directly to the shaft 107 of the one of the rollers 92. The sprockets 121 and 122 are turned through an endless chain 123 by a sprocket 125 which is coupled directly to a drive motor 124 for thus conveying film at a high speed.

The sprocket 121 is not directly coupled to the shaft 106 of the roller 95. That is, the sprocket 121 has outer teeth 126 and inner teeth 127 with the inner teeth 127 engaged with a clutch pawl 128 fixedly secured to the shaft 106 thus forming the one-way clutch. When the sprocket 121 is turned by the chain 123, the rotational movement of the sprocket 121 is transmitted through the clutch pawl 128 engaged with the inner teeth 127 to the shaft 106 to thereby rotate the roller 95. However, the rotation of the shaft 106 is not transmitted to the sprocket 121 because of the one-way clutch in which, for this movement, the clutch pawl 128 slides on the inner teeth 127. Therefore, when the drive motor stops, the film continues to move as long as the rear portion of the film is present between the rollers 95 and 97 whereby the rollers 93, 94, 95 and 97 rotate but the rollers 92 remain stationary.

In the above-described embodiment, limit switches which are operated in response to mechanical contact are employed for the top edge detecting device and the curvature detecting device. However, a detector which is operated by a variation in air flow due to the presence of a photosensitive sheet or a device such as a photoelectric detector which detects the presence of a photosensitive sheet photoelectrically in a contactless mode may be employed as well.

A method and apparatus for delivering photosensitive sheets to an automatic developing machine according to the invention has been described above. In accordance with this embodiment, the position of a photosensitive sheet which determines the timing of suspending the driving of the delivering device which is adapted to deliver a photosensitive sheet to the automatic developing machine at a speed higher than the conveyance speed in the automatic developer is positively and accurately detected.

What is claimed is:

1. A method for processing photosensitive sheets to an automatic developing machine comprising the steps of: opening a cassette holding a photosensitive sheet; allowing said photosensitive sheet to drop by force of gravity in response to said step of opening said cassette; delivering said photosensitive sheet thus dropped to a retaining position shielded from light at a speed higher than a conveyance speed in said automatic developing machine which subsequently processes said photosensitive sheet; shifting a rear edge of said photosensitive sheet to a self-weight slide down position; and delivering said photosensitive sheet to said automatic developing machine from said retaining position.

2. A device for delivering a photosensitive sheet to an automatic developing machine comprising:

means for opening the cover of a cassette holding a photosensitive sheet to allow said photosensitive sheet to drop by force of gravity;

means for guiding said photosensitive sheet discharged from said cassette as it drops by force of gravity;

means receiving said photosensitive sheet from said guiding means for conveying said photosensitive sheet at a speed higher than a conveyance speed in said automatic developing machine which subsequently processes said photosensitive sheet;

retaining means shielded from light for retaining said photosensitive sheet in a horizontally inclined position conveyed thereto by said conveying means;

means for shifting to a self-weight slide down position the rear edge of said photosensitive sheet conveyed to said retaining means; and conveyance guide means for delivering to said automatic developing machine said photosensitive sheet shifted to said self-weight slide down position by said shifting means with the rear edge of said photosensitive sheet at the top.

3. The device as claimed in claim 2 wherein said retaining means further serves as guide means for allowing a photosensitive sheet inserted through a path different from said conveying means to slide down by force of gravity.

4. A device for delivering a photosensitive sheet to an automatic developing machine comprising:

means for opening the cover of a cassette holding a photosensitive sheet to allow said photosensitive sheet to drop by force by gravity;

means for guiding said photosensitive sheet discharged from said cassette as it drops by force of gravity;

means receiving said photosensitive sheet from said guiding means for conveying said photosensitive sheet at a speed higher than a conveyance speed in said automatic developing machine which subsequently processes said photosensitive sheet;

retaining means shielded from light for retaining said photosensitive sheet in a horizontally inclined position conveyed thereto by said conveying means;

means for delivering said photosensitive sheet retained by said retaining means to said automatic developing machine; and means for shifting to said delivering means said photosensitive sheet conveyed to said retaining means by said conveying means with the rear edge of said photosensitive sheet at the top.

5. The device as claimed in claim 4 further comprising means for controlling said delivering means so that said delivering means delivers a photosensitive sheet at a speed higher than said conveyance speed in said automatic developing machine until the top edge of said photosensitive sheet is inserted into said automatic developing machine and said delivering means delivers said photosensitive sheet at a speed equal to said conveyance speed in said automatic developing machine after said top edge has been inserted into said automatic developing machine.

6. A device as claimed in claim 4 further comprising means for controlling said delivering means so that said delivering means delivers a photosensitive sheet at a speed higher than said conveyance speed in said automatic developing machine until the top edge of said photosensitive sheet is inserted into said automatic developing machine and said delivering means is suspended after said top edge has been inserted into said automatic developing machine.

7. The device as claimed in claim 4 wherein said retaining means further serves as guide means for allowing a photosensitive sheet inserted through a path different from said conveying means to slide down by force of gravity.

8. A method for delivering photosensitive sheets to an automatic developing machine comprising the steps of: driving introducing means in said automatic developing machine at an introducing speed; driving delivering means for delivering a photosensitive sheet at a speed higher than said introducing speed in said automatic developing machine; changing the direction of advancement of a top edge of said photosensitive sheet delivered from said delivering means to guide said photosensitive sheet to said introducing means; sensing the curvature change in said photosensitive sheet due to the difference in speeds between said delivering means and said introducing means; and suspending the driving of said delivering means when the difference between said delivering speed and said introducing speed produces a sheet curvature that exceeds a predetermined value.

9. An apparatus for delivering photosensitive sheets to an automatic developing machine comprising:

means for delivering a photosensitive sheet at a speed higher than a conveyance speed in said automatic developing machine;

guide means for changing the direction of advancement of the top edge of said photosensitive sheet delivered from said delivering means to guide said photosensitive sheet to introducing means in said automatic developing machine;

curvature detecting means for detecting when said photosensitive sheet between said delivering means and said introducing means has been curved by at least a predetermined value; and control means for suspending the driving of said delivering means when said curvature detecting means has detected that said photosensitive sheet has been curved by at least said predetermined value.

10. An apparatus for delivering photosensitive sheets to an automatic developing machine comprising:

means for delivering a photosensitive sheet at a speed higher than a conveyance speed in said automatic developing machine;

guide means for changing the direction of advancement of the top edge of said photosensitive sheet delivered from said delivering means to guide said photosensitive sheet to introducing means in said automatic developing machine;

top edge detecting means for detecting the presence of the top edge of said photosensitive sheet at a predetermined position;

curvature detecting means for detecting when said photosensitive sheet between said delivering means and said introducing means has been curved by at least a predetermined value; and control means for suspending the driving of said delivering means when said top edge detecting means has detected the presence of the top edge of said photosensitive sheet at said predetermined position and said curvature detecting means has detected that said photosensitive sheet has been curved by at least said predetermined value.

* * * * *